United States Patent
Vanderheyden

(10) Patent No.: US 8,456,779 B1
(45) Date of Patent: Jun. 4, 2013

(54) TAPE TRANSDUCER POSITIONING ASSEMBLY

(75) Inventor: William Vanderheyden, Loveland, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/359,579

(22) Filed: Jan. 27, 2012

(51) Int. Cl.
*G11B 5/56* (2006.01)

(52) U.S. Cl.
USPC ............................................. 360/291

(58) Field of Classification Search
USPC ........... 360/291, 130.21, 261.1, 261.2, 261.3, 360/265.1, 266.6, 267.6
See application file for complete search history.

(56) References Cited

U.S. PATENT DOCUMENTS 7,542,234 B1 * 6/2009 Goodknight et al. .... 360/130.21
7,706,101 B2   4/2010 Vanderheyden

* cited by examiner

*Primary Examiner* — Allen T Cao
(74) *Attorney, Agent, or Firm* — Brooks Kushman P.C.

(57) ABSTRACT

A tape transducer positioning assembly is provided with a frame with a first rail mounted to the frame. A carriage is mounted to the first rail to translate along the first rail. A transducer is supported by the carriage to cooperate with a tape as the tape is translated relative to the transducer. An actuator is mounted to one of the frame and the carriage and connected to the other of the frame and the carriage to position the carriage, and consequently the transducer relative to the tape. A magnet is mounted to the frame to provide a magnetic field. A second rail is mounted to the carriage generally parallel with the first rail. The second rail is oriented within the magnetic field such that a magnetic force is applied upon the second rail to maintain the second rail within the magnetic field.

18 Claims, 3 Drawing Sheets

TAPE TRANSDUCER POSITIONING ASSEMBLY

TECHNICAL FIELD

Various embodiments relate to transducer positioning assemblies to position a transducer relative to tape.

BACKGROUND

In a data storage and/or data recovery drive utilizing tape as the storage media, a tape transducer, is moved across a width of tape. The tape transducer may be a read head, a write head or a read/write head. In order to minimize out-of-plane movement, the positioning assembly has been provided with guide rails preloaded into bearings or bushings. The preload has been provided by compression, such as by leaf springs. The preload has also been provided by a magnet and an elongated steel member as disclosed in U.S. Pat. No. 7,542,234 B1.

SUMMARY

According to at least one embodiment, a tape transducer positioning assembly comprises a frame with a first rail mounted to the frame. A carriage is mounted to the first rail to translate along the first rail. A transducer is supported by the carriage to cooperate with a tape as the tape is translated relative to the transducer. An actuator is mounted to one of the frame and the carriage and connected to the other of the frame and the carriage to position the carriage, and consequently the transducer relative to the tape. A magnet is mounted to the frame to provide a magnetic field. A second rail is mounted to the carriage generally parallel with the first rail. The second rail is oriented within the magnetic field such that a magnetic force is applied upon the second rail to maintain the second rail within the magnetic field.

According to another embodiment, a tape transducer positioning assembly comprises a frame with a first bushing mounted to the frame. The first bushing is open along its length. A guide shaft is received within the first bushing to translate relative to the first bushing. A carriage is mounted to the guide shaft. A transducer is supported by the carriage to cooperate with a tape as the tape is translated relative to the transducer. An actuator is mounted to one of the frame and the carriage and connected to the other of the frame and the carriage to position the carriage, and consequently the transducer relative to the tape. A rail is mounted to the carriage generally parallel with the guide shaft at an orientation facing a closed side of the first bushing. A second bushing is mounted to the frame offset from the rail in a direction offset from a plane intersecting a center of the guide shaft and a center of the rail. A magnet is mounted to the frame to provide a magnetic field upon the rail to preload the rail against the second bushing and to preload the guide shaft against the first bushing.

According to another embodiment, a tape transducer positioning assembly comprises a frame with a first bushing mounted to the frame. A first guide shaft is received within the first bushing to translate relative to the first bushing. A carriage is mounted to the first guide shaft. A transducer is supported by the carriage to cooperate with a tape as the tape is translated relative to the transducer. An actuator is mounted to one of the frame and the carriage and connected to the other of the frame and the carriage for positioning the carriage, and consequently the transducer relative to the tape. A second guide shaft is mounted to the carriage generally parallel with the first guide shaft. A second bushing is mounted to the frame offset from the rail in a direction offset from a plane intersecting a center of the first guide shaft and a center of the second guide shaft. A tubular segment magnet with an inner radius defining a recess and an outer radius, is mounted to the frame with the second guide shaft disposed within the recess to provide a magnetic field upon the second guide shaft to preload the second guide shaft against the second bushing and to preload the first guide shaft against the first bushing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
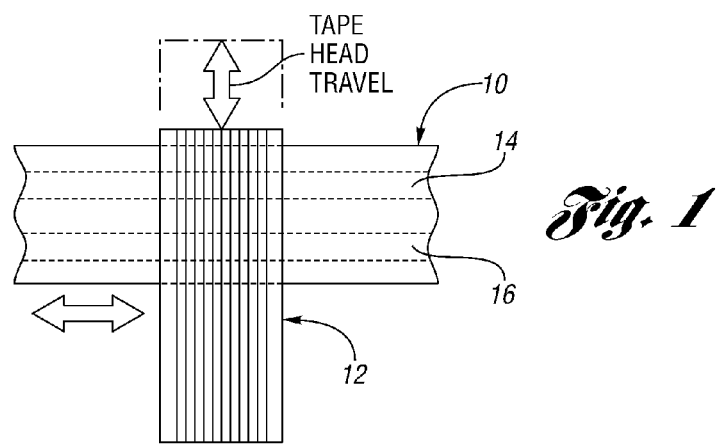
FIG. 1 is a schematic view of a transducer in cooperation with tape and having multiple positions that may be used according to an embodiment.

Referring now to FIG. 1, a portion of magnetic storage tape is illustrated schematically and referenced generally by numeral 10. The tape 10 is illustrated in an environment for data storage and/or data recovery, such as in cooperation with a tape drive that is not shown. Accordingly, the tape 10 is illustrated for translating transversely, in one or both directions, in FIG. 1 across a transducer 12 of the tape drive. The tape transducer 12 may be a read head, a write head or a read/write head. As the tape 10 travels across the transducer 12, the transducer 12 may perform a read and/or write function upon the tape 10. Tape, such as that reference by numeral 10, often has multiple tracks, such as tracks labeled 14 and 16 in FIG. 1. In order to transfer data between the transducer 12 and various tracks 14, 16 the transducer position is adjusted generally perpendicular to the travel of the tape 10 as illustrated in phantom in FIG. 1. Likewise, such positioning may be utilized to maintain alignment of the transducer 12 with a particular track 14, 16 due to track tolerances, and/or travel tolerances.

Figure 2:
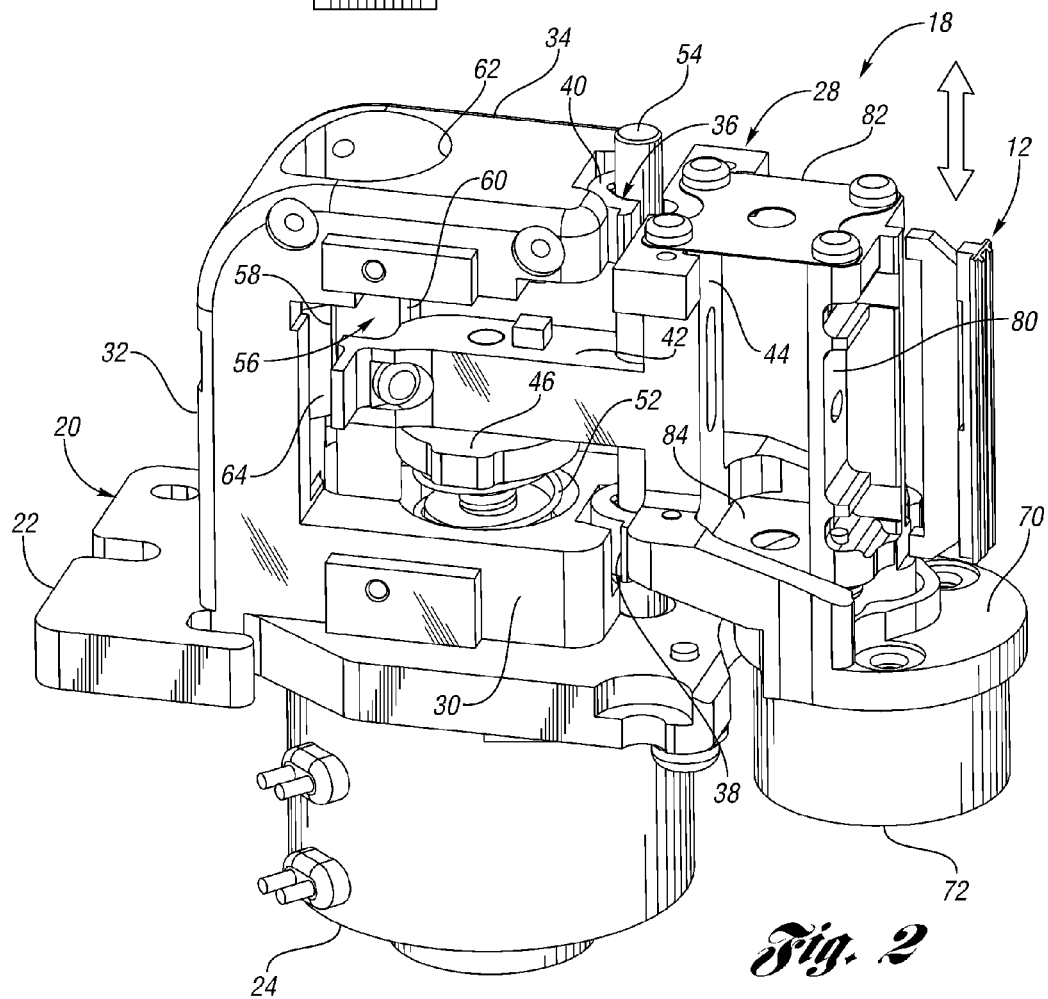
FIG. 2 is a side perspective view of a tape transducer positioning assembly according to an embodiment for positioning the transducer of FIG. 1.
Figure 3:
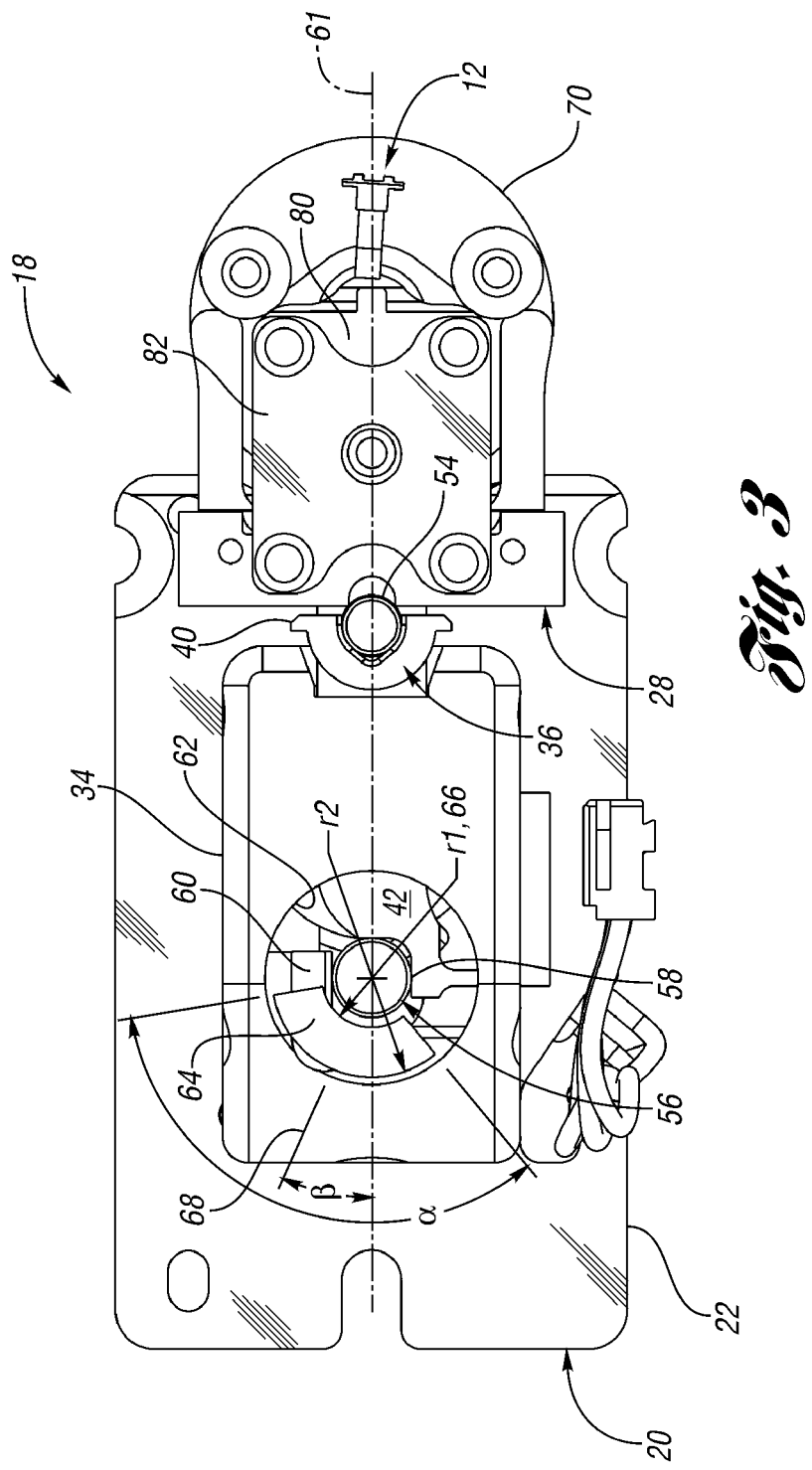
FIG. 3 is a plan view of the tape transducer positioning assembly of FIG. 2.
Figure 4:
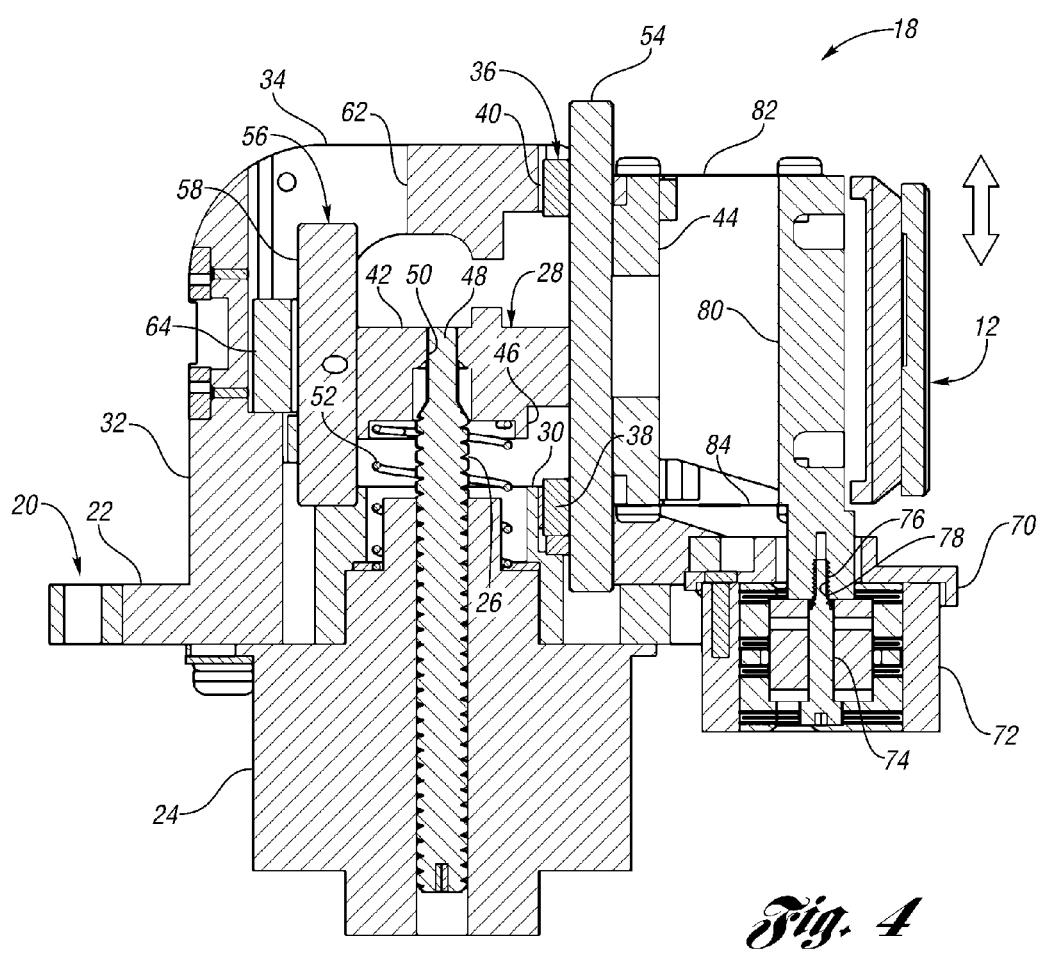
FIG. 4 is a side section view of the tape transducer positioning assembly of FIG. 2.

FIGS. 2-4 illustrate a transducer positioning assembly according to at least one embodiment, and referenced generally by numeral 18. The transducer positioning assembly 18 is utilized for positioning the transducer 12 relative to tape 10 as illustrated in the prior Figure. Thus, the transducer positioning assembly 18 translates the transducer 12 vertically in the orientation of FIGS. 2 and 4, and in a depth direction of FIG. 3.

The transducer positioning assembly 18 includes a frame 20 that is fixed upon an underlying support surface within the environment. In other words, the frame 20 includes a bracket 22 that is fastened at a fixed location within the tape drive. A first linear actuator, such as a linear drive motor 24 is mounted to an underside of the bracket 22. The motor 24 may be a servo motor, or a stepper motor, or the like for linear translation of an output shaft 26 (FIG. 4). The output shaft 26 is connected to a carriage 28 on the frame 20. The carriage 28 supports the transducer 12 and is mounted to the frame 20 for translation along the frame 20 for adjustment of the transducer 12.

The frame 20 includes a base 30 displaced along the bracket 22. A support arm 32 extends upright from the base 30 with a cantilever 34 extending away from the support arm 32 and aligned generally parallel with the base 30. A first rail 36 is provided collectively on the base 30 and the cantilever 34 of the frame 20. A pair of bushings 38, 40 is provided on the frame 20 parallel with the output shaft 26, with one bushing 38 on the base 30 and the other bushing 40 on the cantilever 34. The bushings 38, 40 are each open in a direction facing away from the support arm 32 for providing lengthwise support in less than fully circumscribed directions. For the depicted embodiment, the bushings 38, 40 provide radial support of one hundred and eighty degrees. Of course, various ranges are contemplated. The bushings 38, 40 provide support for translation to the carriage 28 while reducing friction. The bushings 38, 40 in the depicted embodiment are formed from a polymer such as polytetrafluoroethylene (PTFE) with carbon fiber. Alternatively, the bushings 38, 40 may be provided by a suitable alloy such as a copper based alloy; and may be oil-impregnated. Alternatively, bearing assemblies may be provided for the bushings 38, 40 depending on the load of a particular application.

The carriage 28 includes a crossbar 42 and an upright support arm 44 that is generally bisected by the crossbar 42. A retainer cap 46 is provided beneath the crossbar 42. The output shaft 26 extends through the retainer cap 46 and is affixed to the crossbar 42 as depicted in FIG. 4. For example, a distal end 48 of the output shaft 26 may be threaded and engaged within a threaded aperture 50 in the crossbar 42. A compression spring, such as a coil spring 52, may be retained between the retainer cap 46 and the drive motor 24 for preloading the crossbar 42 for providing a suspension for the crossbar 42.

A first guide shaft 54 is mounted to the crossbar 42 and extends longitudinally from the crossbar 42 in opposed directions. The first guide shaft 54 is oriented adjacent to an intersection of the crossbar 42 and the support arm 44; and is received within the bushings 38, 40 for supporting the carriage 28 for translation relative to the frame 20, as the carriage 28 is driven by the motor 24.

A second rail 56 is provided on a distal end of the crossbar 42 and is spaced apart from the first rail 36. The second rail 56 is provided by a second guide shaft 58 that is ferrous and is mounted to the distal end of the crossbar 42 and extends from the crossbar 42 in both opposed longitudinal directions. With reference specifically to FIG. 3, a flat bushing 60 is provided on the support arm 32 as viewable through a clearance aperture 62 in the cantilever 34. The flat bushing 60 is offset generally perpendicular from a plane 61 extending through a center of the guide shafts 54, 58. The flat bushing 60 is contacted by the second guide shaft 58 and prevents rotation of the carriage 28 about the first guide shaft 54 in a counter-clockwise direction in FIG. 3. Although a flat bushing is depicted various bushings configurations and/or bearing assemblies are contemplated.

A magnet 64 is also provided on the support arm 32 for providing a magnetic field upon the second guide shaft 58 that attracts or forces the second guide shaft 58, and consequently the distal end of the crossbar 42 of the carriage 28 toward the magnet 64. This magnetic force upon the second guide shaft 58 preloads the second guide shaft 58 against the flat bushing 60 thereby resisting rotation of the carriage 28 about the first guide shaft 54 in a counter-clockwise direction in FIG. 3. The resisted rotation minimizes movement of the transducer 12 out-of-plane to enhance the cooperation of the transducer 12 with the corresponding tape 10. The magnetic force also preloads the first guide shaft 54 against the bushings 38, 40.

The magnet 64 is a segment of a hollow tubular cylinder with an inner radius r1 and an outer radius r2. The inner radius r1 provides a semi-cylindrical recess 66 for receiving the second guide shaft 58 without contact. The semi-cylindrical segment configuration of the magnet 64; and the cylindrical configuration of the second guide shaft 58, provides a uniform magnetic force upon the second guide shaft with a vector toward a bisection 68 of the magnet 64.

An overall angular dimension $\alpha$ of the magnet 64 from the lateral ends of the magnet, can efficiently be less than 180 degrees, because any dimension over 180 degrees would counteract and reduce the magnetic force upon the second guide shaft 58. Effectively, a range of 90 to 150 degrees is suitable for the angular dimension $\alpha$. In the depicted embodiment, the overall angular dimension $\alpha$ is 120 degrees. The bisection 68 of the magnet 64 is offset from the plane 61 extending through the center of each of the guide shafts 54, 58 in a direction toward the flat bushing 60 to preload the second guide shaft 58 against the flat bushing 60. The magnet 64 is also oriented on a side of the second guide shaft 58 spaced apart from the first guide shaft 54 in order to preload the first guide shaft 54 against the bushings 38, 40. A suitable vector for the magnetic field is provided by offsetting the bisection 68 of the magnet 64 angularly by angle $\beta$ in FIG. 3 from the plane 61 and toward the flat bushing 60. The angle $\beta$ may be thirty degrees, by way of example.

The utilization of open bushings 38, 40, 60 reduces friction and consequently enhances longevity of the bushings 38, 40, 60 and the associated shafts 54, 58. The open bushings 38, 40, 60 also reduce vibrations associated with prior art bushings that fully circumscribe the associated shafts. Reduction of vibrations improves the tracking and positioning of the transducer 12. The preloading of the shafts 54, 58 provides accurate and repeatable positioning of the shafts 54, 58, carriage 28 and consequently the transducer 12. Utilization of the semi-cylindrical magnet 64 permits utilization of the open bushings 38, 40, 60 while omitting the use of springs, which fatigue over time and require contact.

Referring again to FIGS. 2-4, the motor 24 may be utilized for coarse adjustment of the transducer 12. A bracket 70 extends from the support arm 44 of the carriage 28. A second linear drive motor 72 is fastened to the bracket 70 for providing smaller incremental adjustments. An output shaft 74 of the second motor 72 has a threaded distal end 76 received within a threaded aperture 78 of a second carriage 80. The second carriage 80 is connected to the first carriage 28 by a pair of leaf springs 82, 84 for linear translation of the second carriage 80. The transducer 12 is supported upon the second carriage 80. Thus, coarse adjustment of the first carriage 28, and consequently the transducer 12 is provided by the first linear drive motor 24; while fine adjustment of the second carriage 80, and consequently the transducer 12 is provided by the second linear drive motor 72.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tape transducer positioning assembly comprising:
a frame;
a first rail mounted to the frame;
a carriage mounted to the first rail to translate along the first rail;
a transducer supported by the carriage to cooperate with a tape as the tape is translated relative to the transducer;
an actuator mounted to one of the frame and the carriage and connected to the other of the frame and the carriage to position the carriage, and consequently the transducer relative to the tape;
a magnet mounted to the frame to provide a magnetic field;
a second rail mounted to the carriage generally parallel with the first rail, the second rail being oriented within the magnetic field such that a magnetic force is applied upon the second rail to maintain the second rail within the magnetic field; and
a bushing mounted to the frame and offset from the second rail in a direction toward the magnet such that the magnet preloads the second rail against the bushing;
wherein the second rail comprises a guide shaft.

2. The tape transducer positioning assembly of claim 1 wherein the magnet is shaped with a partially cylindrical recess formed therein and oriented about the guide shaft to preload the guide shaft.

3. The tape transducer positioning assembly of claim 1 wherein the first rail comprises a bushing; and
wherein the tape transducer positioning assembly further comprises a guide shaft mounted to the carriage and received within the bushing.

4. The tape transducer positioning assembly of claim 3 wherein the bushing is open along its length in a direction spaced apart from the magnet so that the magnet preloads the guide shaft against the bushing.

5. The tape transducer positioning assembly of claim 4 wherein the bushing is further defined as a first bushing; and
wherein the tape transducer positioning assembly further comprises a second bushing mounted to the frame and offset from the second rail in a direction of the magnet such that the magnet preloads the second rail against the second bushing to prevent rotation of the carriage about the guide shaft.

6. The tape transducer positioning assembly of claim 5 wherein the second bushing is offset from the second rail in a direction that is generally perpendicular to a direction between the first rail and the second rail.

7. The tape transducer positioning assembly of claim 5 wherein the guide shaft is further defined as a first guide shaft; and
wherein the second rail further comprises a second guide shaft.

8. The tape transducer positioning assembly of claim 7 wherein the magnet has a partially cylindrical recess oriented about the second guide shaft to preload the second guide shaft against the second bushing and to preload the first guide shaft against the first bushing.

9. The tape transducer positioning assembly of claim 1 wherein the carriage is further defined as a first carriage;
wherein the actuator is further defined as a first actuator for coarse positioning of the transducer; and
wherein the tape transducer positioning assembly further comprises:
a second carriage mounted to the first carriage to translate along the first carriage, wherein the transducer is supported by the second carriage, and
a second actuator mounted to one of the first carriage and the second carriage and connected to the other of the first carriage and the second carriage for fine positioning of the second carriage, and consequently the transducer relative to the tape.

10. A tape transducer positioning assembly comprising:
a frame;
a first bushing mounted to the frame, the first bushing being open along its length;
a guide shaft received within the first bushing to translate relative to the first bushing;
a carriage mounted to the guide shaft;
a transducer supported by the carriage to cooperate with a tape as the tape is translated relative to the transducer;
an actuator mounted to one of the frame and the carriage and connected to the other of the frame and the carriage to position the carriage, and consequently the transducer relative to the tape;
a rail mounted to the carriage generally parallel with the guide shaft at an orientation facing a closed side of the first bushing;
a second bushing mounted to the frame offset from the rail in a direction offset from a plane intersecting a center of the guide shaft and a center of the rail; and
a magnet mounted to the frame to provide a magnetic field upon the rail to preload the rail against the second bushing and to preload the guide shaft against the first bushing.

11. The tape transducer positioning assembly of claim 10 wherein the guide shaft is further defined as a first guide shaft; and
wherein the rail further comprises a second guide shaft.

12. The tape transducer positioning assembly of claim 11 wherein the magnet defines a partially cylindrical recess oriented about the second guide shaft to preload the second guide shaft against the second bushing and to preload the first guide shaft against the first bushing.

13. The tape transducer positioning assembly of claim 12 wherein the magnet is shaped as a tubular segment defining an inner radius providing the recess, and an outer radius.

14. A tape transducer positioning assembly comprising:
a frame;
a first bushing mounted to the frame;
a first guide shaft received within the first bushing to translate relative to the first bushing;
a carriage mounted to the first guide shaft;
a transducer supported by the carriage to cooperate with a tape as the tape is translated relative to the transducer;
an actuator mounted to one of the frame and the carriage and connected to the other of the frame and the carriage to position the carriage, and consequently the transducer relative to the tape;
a second guide shaft mounted to the carriage generally parallel with the first guide shaft;
a second bushing mounted to the frame offset from the rail in a direction offset from a plane intersecting a center of the first guide shaft and a center of the second guide shaft; and
a tubular segment magnet with an inner radius defining a recess and an outer radius mounted to the frame with the second guide shaft disposed within the recess to provide a magnetic field upon the second guide shaft to preload the second guide shaft against the second bushing and to preload the first guide shaft against the first bushing.

15. The tape transducer positioning assembly of claim 14 wherein the tubular segment has an angular dimension from lateral end to lateral end of approximately ninety to one hundred and fifty degrees.

16. The tape transducer positioning assembly of claim 14 wherein the tubular segment has an angular dimension from lateral end to lateral end of approximately one hundred and twenty degrees.

17. The tape transducer positioning assembly of claim 14 wherein a bisection of the tubular segment is offset from a plane extending through a center of the first guide shaft and a center of the second guide shaft in a radial direction towards the second bushing to preload the second guide shaft against the second bushing.

18. The tape transducer positioning assembly of claim 17 wherein the bisection of the tubular segment is offset from the plane extending through the center of the first guide shaft and the center of the second guide shaft by approximately thirty degrees.

* * * * *